(12) United States Patent
Coleman et al.

(10) Patent No.: US 6,196,818 B1
(45) Date of Patent: Mar. 6, 2001

(54) MOLD SECTION AND DIE RIBS FOR TIRE CURING MOLD

(75) Inventors: Richard E. Coleman, Brentwood; William A. Glasenapp, Gallatin, both of TN (US)

(73) Assignee: Bridgestone/Firestone Research, Inc., Akron, OH (US)

( * ) Notice: Subject to any disclaimer, the term of this patent is extended or adjusted under 35 U.S.C. 154(b) by 0 days.

(21) Appl. No.: 09/268,290

(22) Filed: Mar. 15, 1999

(51) Int. Cl.[7] .................................................... B29C 33/42
(52) U.S. Cl. ............................ 425/28.1; 425/46; 425/195
(58) Field of Search ............................. 425/28.1, 35, 46, 425/193, 195

(56) References Cited

U.S. PATENT DOCUMENTS

| | | | |
|---|---|---|---|
| 3,664,406 | * 5/1972 | Mawson et al. | 164/161 |
| 3,852,006 | * 12/1974 | Irie | 425/46 |
| 3,893,794 | * 7/1975 | Acda | 425/393 |
| 4,531,902 | * 7/1985 | Stuhldreher et al. | 425/408 |
| 4,552,522 | 11/1985 | Van Melle | 425/182 |
| 4,708,609 | * 11/1987 | Yoda et al. | 425/28.1 |
| 4,856,976 | * 8/1989 | Rook et al. | 425/320 |
| 5,163,501 | 11/1992 | Tanaka et al. | 164/342 |
| 5,208,044 | * 5/1993 | Miyata et al. | 425/46 |
| 5,429,172 | 7/1995 | Hand | 164/34 |
| 5,564,492 | 10/1996 | Preiss | 164/516 |
| 5,730,204 | * 3/1998 | Shimmell | 164/312 |

\* cited by examiner

Primary Examiner—James P. Mackey
(74) Attorney, Agent, or Firm—Michael Sand; Thomas R. Kingsbury

(57) ABSTRACT

A mold for a pneumatic tire includes a plurality of mold sections that cooperate to form an annular mold. Each of the mold sections has a body with an inner surface. The body defines at least one longitudinal groove that opens at the inner surface. The body defines at least one longitudinal groove that opens at the inner surface. The groove has a mouth and a body with the width of the mouth being smaller than at least the largest width of the body. In one embodiment of the invention, the groove has a female dovetail cross section. The grooves in the mold sections cooperate to form a continuous, 360 degree groove about the tire mold. A plurality of die ribs are slidingly disposed in the grooves. Each die rib has a base that corresponds with the cross section of the groove. Thus, the die rib in the above-embodiment has a male dovetail cross section that is configured to slide within the groove. The dovetail configurations form an interference fit between the die ribs in the mold sections while allowing the die ribs to be installed by sliding them longitudinally within the grooves.

14 Claims, 5 Drawing Sheets

MOLD SECTION AND DIE RIBS FOR TIRE CURING MOLD

BACKGROUND OF THE INVENTION

1. Technical Field

This invention generally relates to pneumatic tire molds and, more particularly, to the connection between the die ribs that form the tire tread pattern and the mold sections of a pneumatic tire mold. Specifically, the present invention discloses tire mold sections that each have at least one dovetailed groove that slidingly receives a plurality of dovetailed die ribs with the die ribs cooperating to form a continuous, 360 degree die when a plurality of mold sections are fit together to form a tire mold.

2. Background Information

Pneumatic tire molds must have inwardly-projecting continuous dies that form the continuous tire tread on a pneumatic tire during the molding process. These inwardly-projecting dies are formed by combining a plurality of die ribs that are each individually connected to a section of the tire mold. Although the exact number of die ribs and mold sections vary in specific applications, approximately nine mold sections and approximately seventy to seventy-five die ribs are used to form the continuous, 360 degree die in at least one example of a tire mold. A typical pneumatic tire uses three or four of these continuous dies to form the tread pattern of the tire.

Most tire tread patterns include repetitive elements that allow repetitive die ribs to be used to form the continuous, 360 degree tread die of the tire mold. The repetitive die ribs may be formed by any of a variety of molding methods or machining methods known in the art. One molding method that is used to form the die ribs is lost wax casting. Lost wax casting uses a wax representation of the final die rib that is coated with an appropriate material. The wax is melted out of the coating leaving a hollow mold. Although this method allows the intricate projections for the sipes and blades of the tread pattern to be formed on the die ribs, the method does not allow holes to be formed in the molded piece. Such holes have been used in the art to receive pins that connect the die ribs to the mold sections.

In prior art molds, the mold makers had to machine holes into each of the die ribs so that they could be connected to the mold sections. For a typical tire mold, the mold makers had to machine 210 to 300 of the die ribs as well as machining corresponding holes into the mold sections. One typical method of connecting the die ribs to the mold sections is depicted in FIG. 7. The configuration depicted in FIG. 7 includes a prior art die rib 10 connected to a prior art mold section 12. Mold section 12 is formed with a longitudinal rectangular shaped groove 14 into which the base 16 of die rib 10 is inserted. Various projections 18 that form the sipes and blades in the pneumatic tire tread pattern project from die rib 10 and are configured to abut the inner surface 20 of mold section 12. In the past, a machinist drilled a pair of holes 22 in mold section 12 that were configured to align with a pair of holes 24 that were drilled into die rib 10. A pair of pins 26 were then used to connect die rib 10 to mold section 12. Although this connection configuration is not overly complicated, it is time consuming when repeated on 210 to 300 die ribs. It is thus desired in the art to provide a die rib and mold section configuration that allows the die ribs to be quickly and easily connected to the mold sections without the machining steps.

SUMMARY OF THE INVENTION

In view of the foregoing, it is an objective of the present invention to provide a mold section and die rib for a pneumatic tire mold that are configured to slide together and automatically form a secure connection without additional connection elements.

Another objective of the present invention is to provide a mold section that accepts die ribs that may be formed by typical molding methods such as lost wax casting.

Another objective of the present invention is to provide a mold section having at least one longitudinal groove into which at least one die rib is slidingly received with a groove and die rib forming an interference fit in a direction substantially perpendicular to the longitudinal direction of the groove.

Another objective of the present invention is to provide a mold section having a female dovetailed groove and a die rib having a male dovetailed base that is slidingly received in the female dovetailed groove of the mold section.

Another objective of the present invention is to provide a pneumatic tire mold having a plurality of die ribs that are connected to a plurality of mold sections with an interference fit.

Another objective of the present invention is to provide an effective, safe, inexpensive and efficient device that achieves all the enumerated objectives, provides for eliminating difficulties encountered with prior devices, and solves problems and obtains new results in the art.

These and other objectives and advantages of the present invention are achieved by the combination of a mold section and a die rib for a pneumatic tire mold, the combination including a mold section having a body with an interface; a body defining at least one longitudinal groove that opens up the inner surface; the groove having a mouth and a body, the width of the mouth being smaller than the largest width of the body; and a die rib having a body and a base; the base being slidingly received in the groove.

Other objectives and advantages of the present invention are achieved by a die rib for a pneumatic tire mold, the die rib including a body; and a base connected to the body, the base having a male dovetailed cross section.

Yet other objectives and advantages of the present invention are achieved by a mold section for a pneumatic tire mold, the mold section including a body with an inner surface; the body defining at least one longitudinal groove that opens at the inner surface; and the groove having a mouth and a body, the width of the mouth being smaller than the largest width of the body.

BRIEF DESCRIPTION OF THE DRAWINGS

The preferred embodiment of the invention, illustrative of the best mode in which applicant contemplated applying the principles of the invention is set forth in the following description and is shown in the drawings and is particularly and distinctly pointed out and set forth in the appended claims.

Similar numbers refer to similar parts throughout the drawings.

DESCRIPTION OF THE PREFERRED EMBODIMENT

Figure 1:
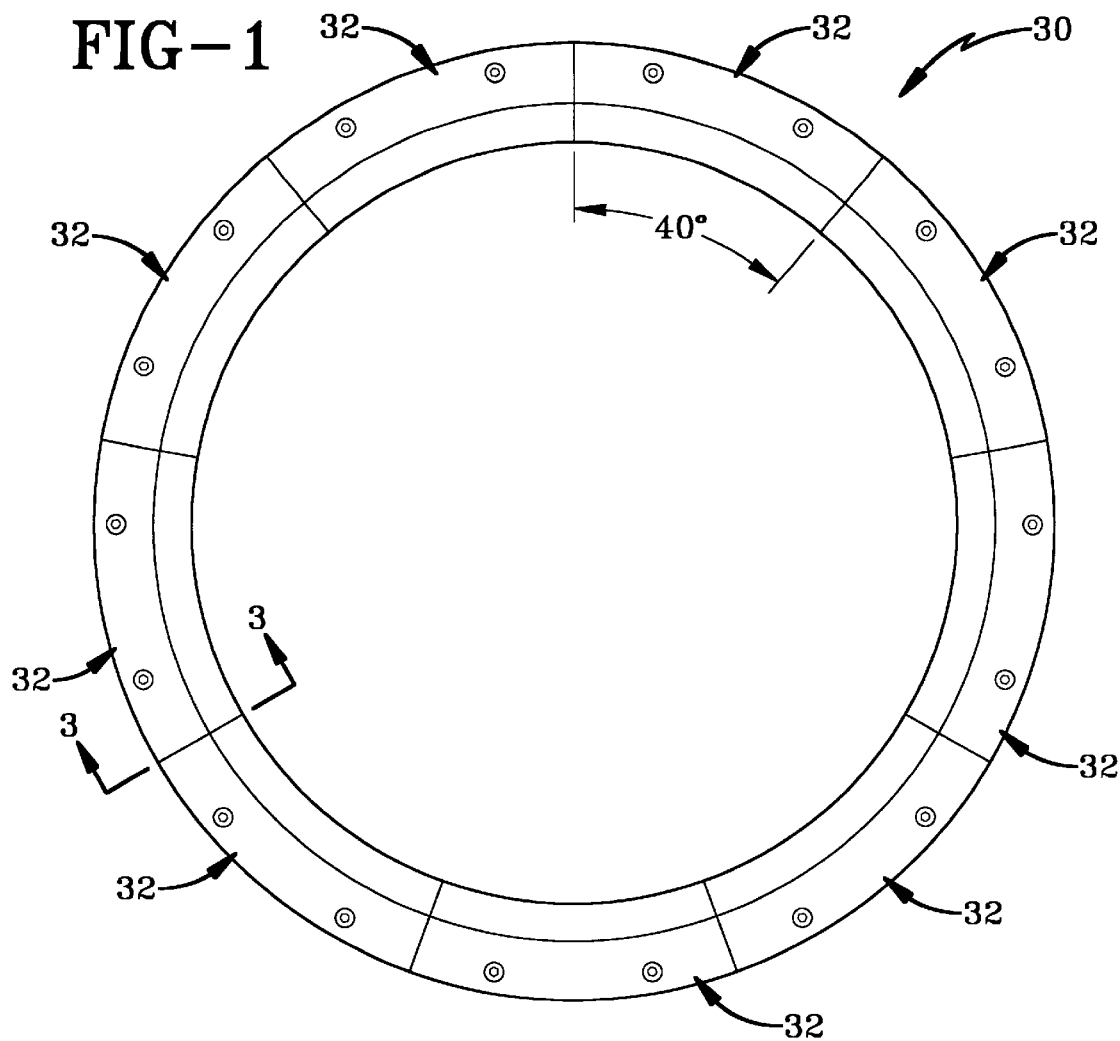
FIG. 1 is a top view of tread forming mold for a pneumatic tire.
Figure 2:
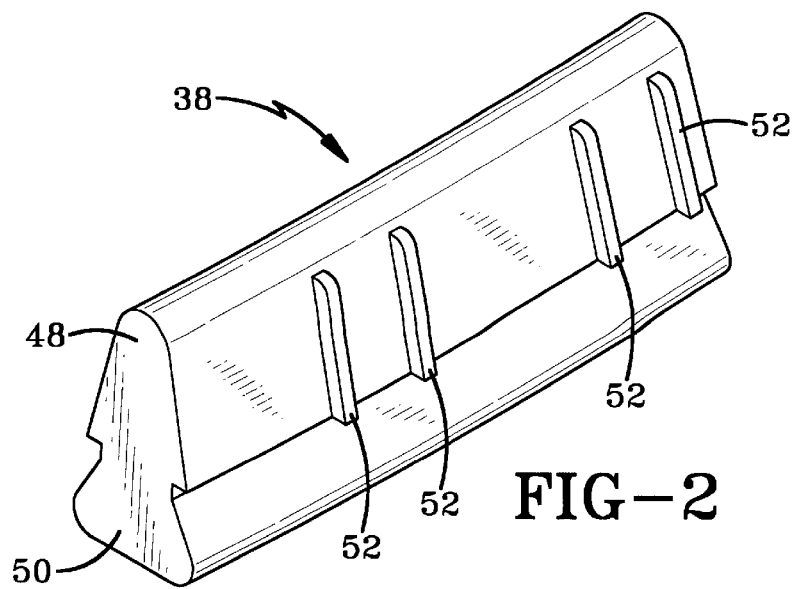
FIG. 2 is an enlarged perspective view of a single die rib of the present invention.

A pneumatic tire mold formed from mold sections and die ribs of the present invention is indicated generally by the numeral 30 in FIG. 1. Tire mold 30 includes a plurality of individual mold sections 32 that cooperate to form an annular mold. In the preferred embodiment of the invention depicted in FIG. 1, nine mold sections 32 are used to form the annular mold. In other embodiments of the invention, different numbers of mold section 32, such as in the range of six to ten inclusive, may be combined to form the annular mold.

Figure 3:
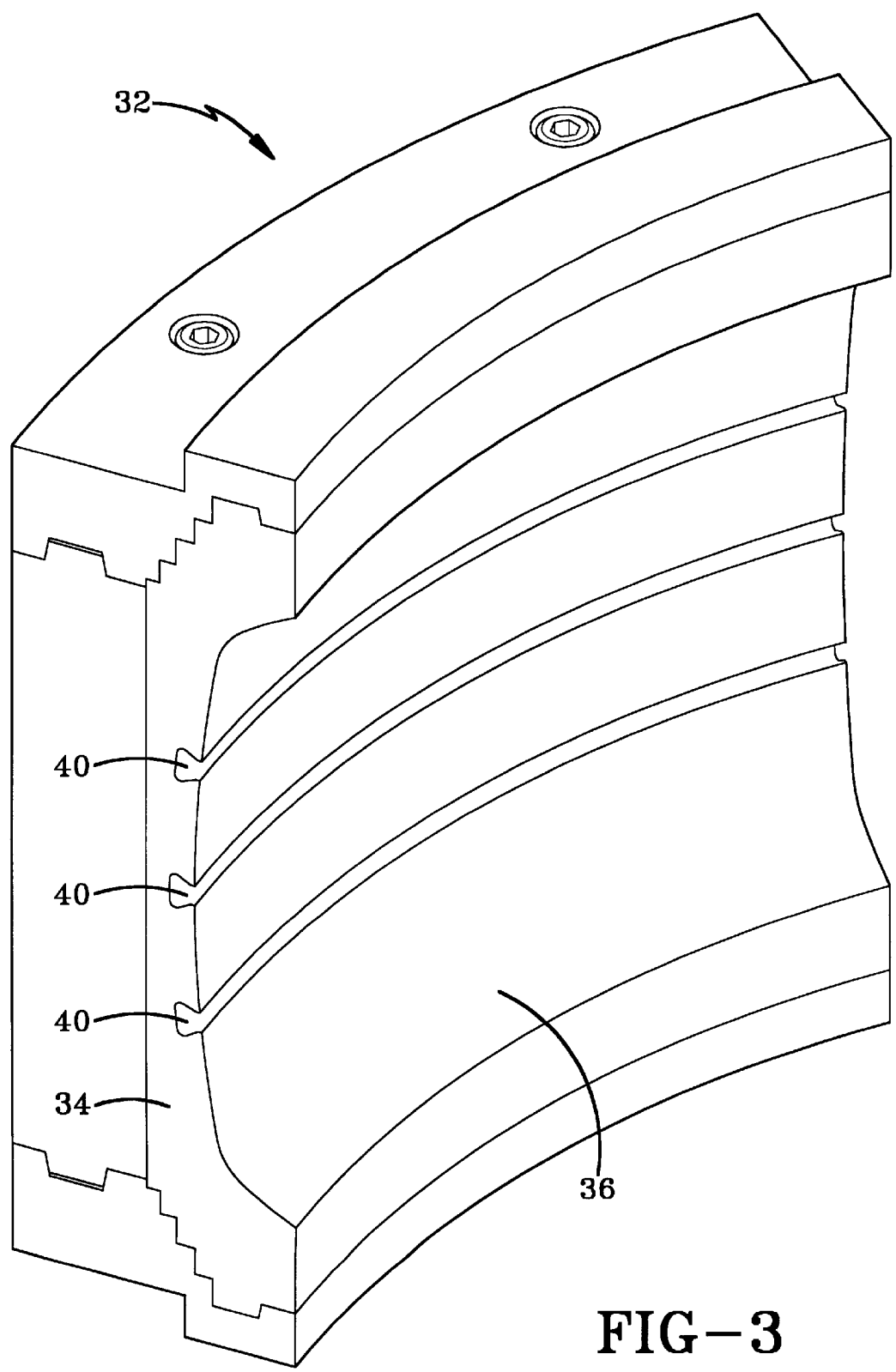
FIG. 3 is a perspective view of a single mold section having the dovetailed grooves of the present invention.
Figure 4:
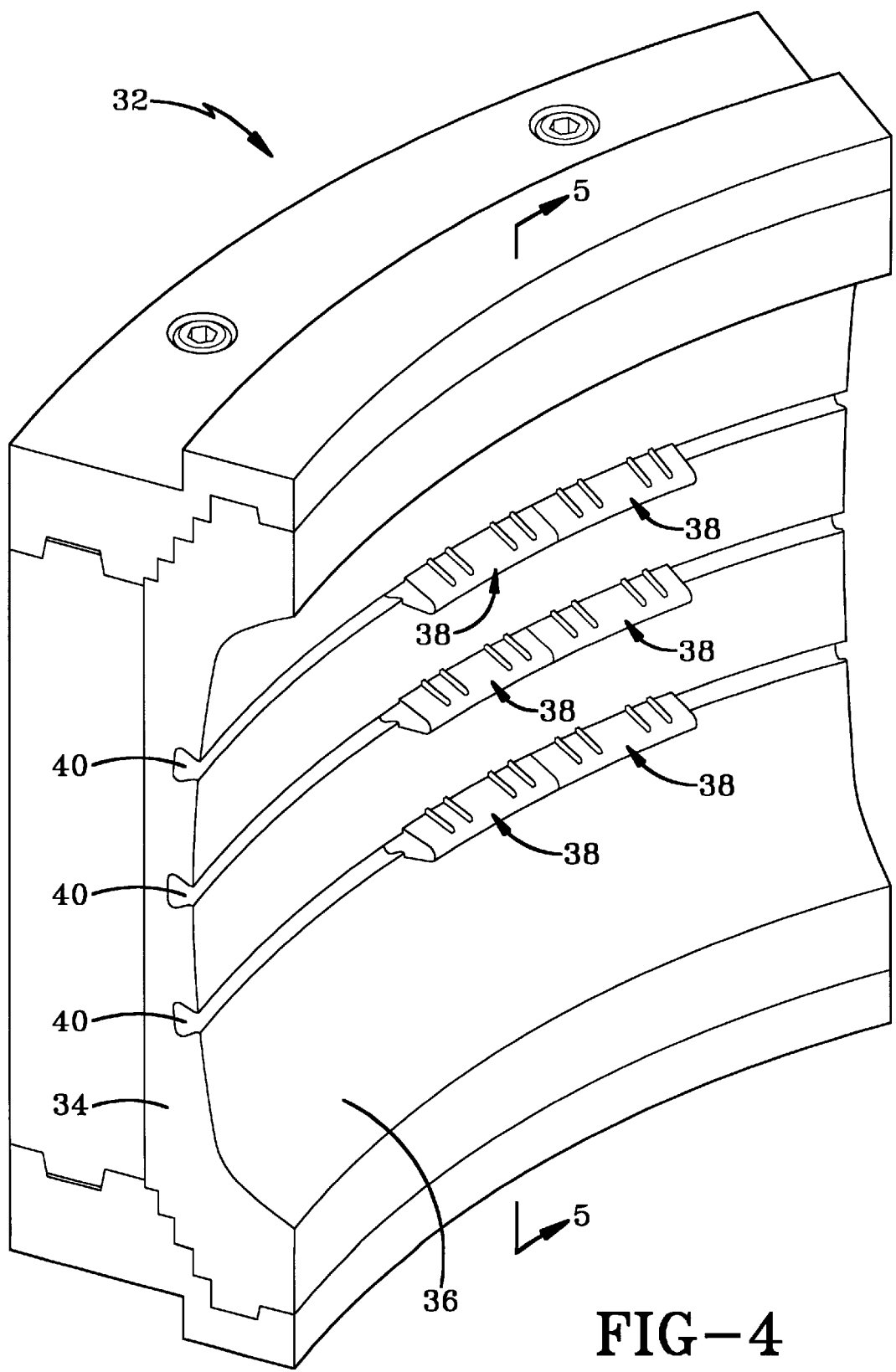
FIG. 4 is perspective view of the mold section of FIG. 3 with a plurality of the die ribs of the present invention installed in the mold section.
Figure 5:
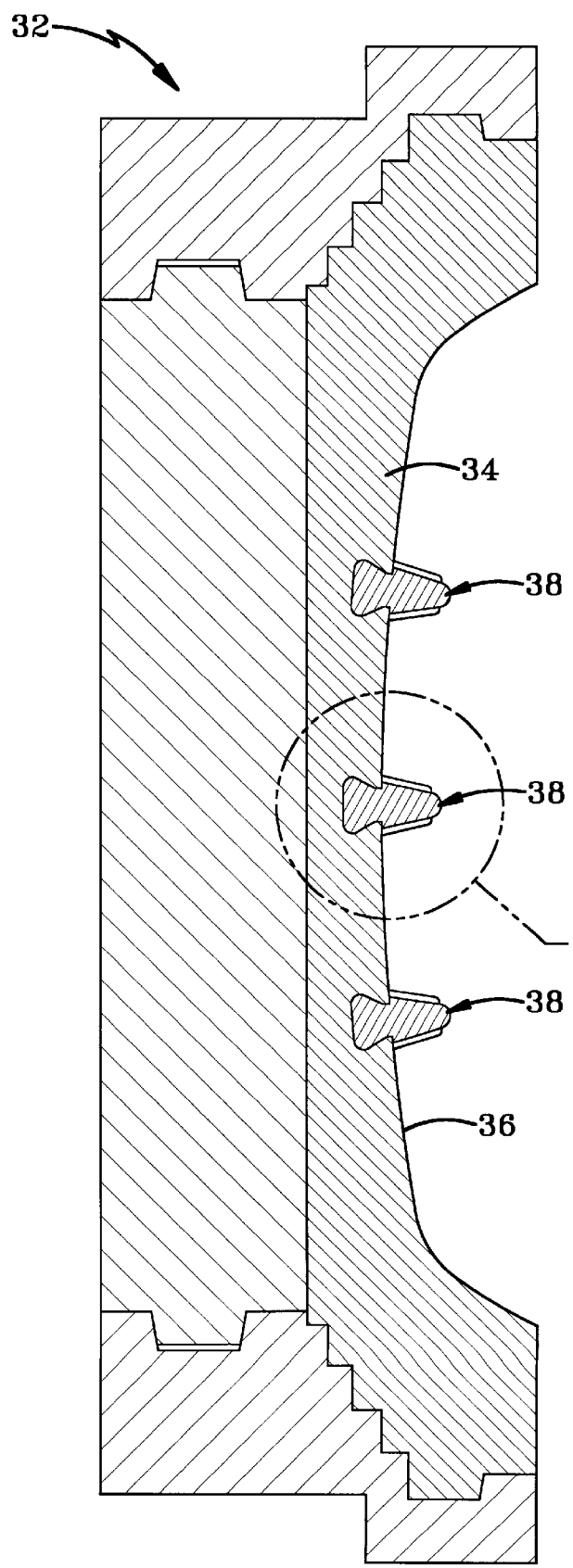
FIG. 5 is am enlarged sectional view taken along line 5—5 of FIG. 4.

Each mold section 32 (FIG. 3) includes a body 34 having an inner surface 36. A green tire is pressed up against inner surfaces 36 of mold sections 32 of the tire mold 30 to impart the shape of tire mold 30 to the tire being molded. Tire mold 30 is thus provided with a plurality of die ribs 38 as depicted in FIG. 4 to impart a tread pattern to the green tire being molded.

Each die rib 38 is received in a longitudinal circumferentially extending groove 40 that is formed in body 34 of mold section 32. Each groove 40 in body 34 is configured to form an interference fit with a die rib 38 in a direction substantially perpendicular to the longitudinal direction of groove 40. The interference-fit connection between die ribs 38 and longitudinal grooves 40 is the subject of the present application.

Grooves 40 are positioned in mold sections 32 so that they connect with each other when mold sections 32 cooperate to form tire mold 30. As such, grooves 40 cooperate to form continuous, 360 degree grooves that extend circumferentially about tire mold 30. Grooves 40 thus allow the tread pattern to be formed on the tire being molded in tire mold 30. In the embodiment of the invention depicted in the drawings, three spaced apart grooves 40 are depicted. In other embodiments of the present invention, mold section 32 may have a single groove, two grooves, four grooves or more, preferably within the range of two and five inclusive, depending on the type of tire being molded and the tread pattern that is used with the tire.

In accordance with the objectives of the present invention, each groove 40 has a mouth 42 that opens at inner surface 36 of body 34. The width 44 of mouth 42 is smaller than the largest width 46 of the body of groove 40. This configuration ensures that a corresponding die rib 38 will form an interference fit with groove 40 and be retained on mold section 32.

Figure 6:
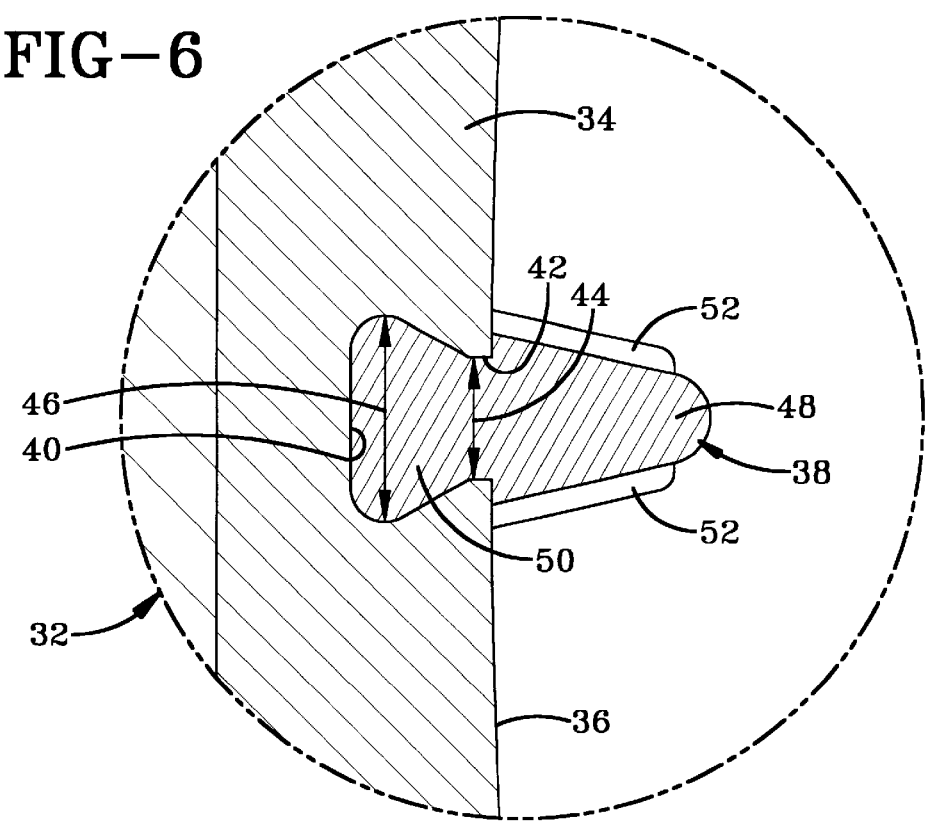
FIG. 6 is an enlarged view of the area in FIG. 5 that is encircled.
Figure 7:
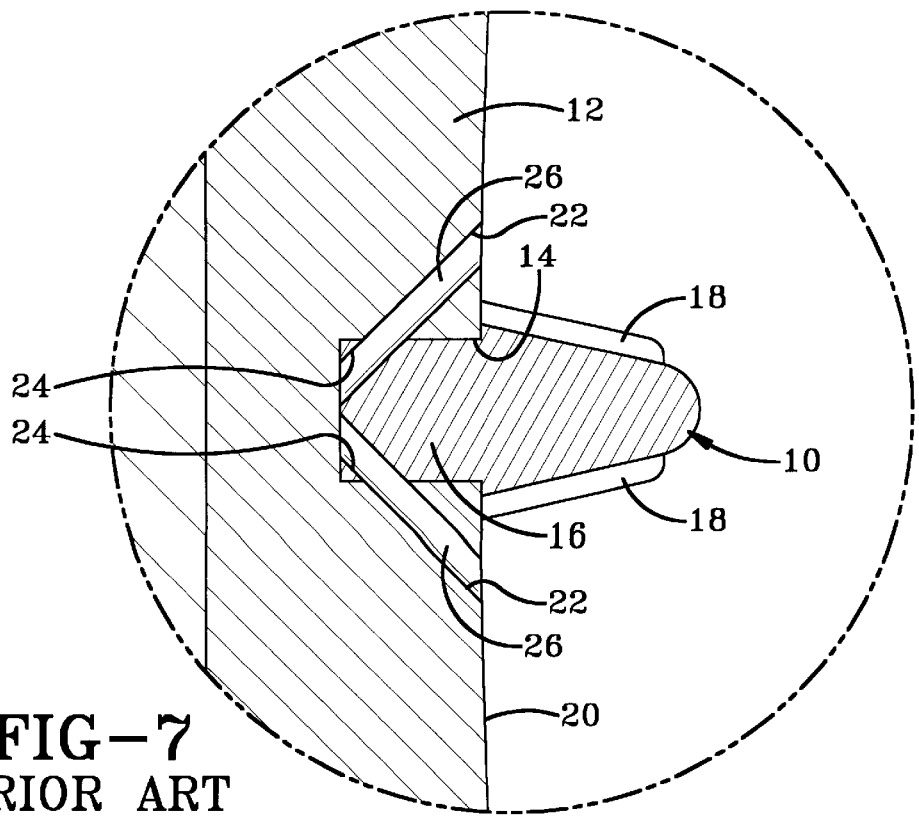
FIG. 7 is a view similar to FIG. 6 but showing a prior art die rib connected to a prior art mold section.

In accordance with another objective of the present invention, each groove 40 has a female dovetail cross section as depicted in FIG. 6. Other cross sections having body widths greater than mouth widths are also contemplated by the present invention. The dovetail configuration is provided as a preferred example.

Each die rib 38 includes a body 48 that is integrally connected to a base 50. Die rib 38 may be formed by appropriate known casting methods and is preferably fabricated from stainless steel. Other fabrication methods and materials are also contemplated by the present invention. In accordance with the objectives of the present invention, base 50 has a male dovetail cross section that corresponds to the female dovetail cross section of groove 40. Die rib 38 also includes a plurality of projections 52 that form the blades and sipes in the tire tread when the tire is molded.

In other embodiments of the present invention, base 50 of die rib 38 does not have a male dovetail cross section but has a cross section that corresponds with groove 40. Base 50 and groove 40 are configured such that die rib 38 may slide longitudinally within groove 40 but forms an interference fit with body 34 in a direction perpendicular to the longitudinal direction of groove 40, that is, radially with respect to the circumferential direction of groove 40. The sliding connection between die ribs 38 and body 34 allows tire mold 30 to be quickly and easily assembled by simply sliding die ribs 30 into place until each groove 40 is completely filled with die ribs 38. No connection pins or other connection elements are required to hold die ribs 38 in place and no machining is required to form pin holes or other connection devices as were required in the prior art.

Accordingly, the improved tire curing mold having dovetailed mold sections and die ribs is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the tire curing mold having dovetailed mold sections and die ribs is constructed and used, the characteristics of the construction, and the advantageous new and useful results obtained; the new and useful structures, devices, elements, arrangements, parts, and combinations are set forth in the appended claims.

We claim:

1. In combination, a mold section and die rib for a pneumatic tire mold, the combination comprising:

a mold section having a body with an inner surface;

the body defining at least one longitudinal groove that opens at the inner surface;

the groove having a mouth and a body, the width of the mouth being smaller than the largest width of the body; and a die rib having a body and a base; the base being slidingly received in the groove.

2. The combination of claim 1, wherein the groove has a female dovetail cross section.

3. The combination of claim 2, wherein the base of the die rib has a male dovetail cross section that complements the female dovetail cross section of the groove.

4. The combination of claim 1, wherein the body of the mold section defines a plurality of spaced apart, longitudinal grooves.

5. The combination of claim 4, wherein the body of the mold section defines three grooves.

6. In a tire mold for a pneumatic tire having a plurality of mold sections with each mold section having at least one longitudinal groove and at least one die rib disposed in the longitudinal groove, the improvement comprising:

the groove having a female dovetail cross section and the die rib having a male dovetail cross section complementary to the female dovetail of the groove.

7. The improvement of claim 6, wherein each mold section has a plurality of spaced-apart grooves with each groove having a female dovetail cross section.

8. The improvement of claim 7, wherein each mold section has a plurality of grooves in the range of two to five inclusive.

9. A mold for a pneumatic tire comprising:

a plurality of mold sections cooperating to form an annular mold;

each of the mold sections having a body with an inner surface;

the body defining at least one longitudinal groove that opens at the inner surface;

the groove having a mouth and a body, the width of the mouth being smaller than at least the largest width of the body of the groove;

the grooves cooperating to form a continuous, 360 degree groove; and at least one die rib having a body and a base; the cross section of the base complementing the groove with the base being slidingly received in the groove.

10. The combination of claim 9, wherein each groove has a female dovetail cross section.

11. The combination of claim 10, wherein the base of the die rib has a male dovetail cross section.

12. The combination of claim 9, wherein the body of each mold section defines a plurality of spaced apart, longitudinal grooves.

13. The combination of claim 12, wherein the body of each mold section defines three grooves.

14. The combination of claim 9, wherein the annular mold is formed by a plurality of the mold sections in the range of six to ten inclusive.

* * * * *